(12) United States Patent
Yoon

(10) Patent No.: US 8,749,736 B2
(45) Date of Patent: Jun. 10, 2014

(54) COLOR FILTER USING SURFACE PLASMON, LIQUID CRYSTAL DISPLAY DEVICE AND METHOD FOR FABRICATING THE SAME

(75) Inventor: Min-Sung Yoon, Paju (KR)

(73) Assignee: LG Display Co., Ltd., Seoul (KR)

(*) Notice: Subject to any disclaimer, the term of this patent is extended or adjusted under 35 U.S.C. 154(b) by 666 days.

(21) Appl. No.: 12/941,846

(22) Filed: Nov. 8, 2010

(65) Prior Publication Data

US 2011/0149217 A1 Jun. 23, 2011

(30) Foreign Application Priority Data

Dec. 18, 2009 (KR) .................. 10-2009-0127433

(51) Int. Cl.
*G02F 1/1335* (2006.01)
(52) U.S. Cl.
USPC ............ 349/109; 349/106; 349/107; 349/108
(58) Field of Classification Search
USPC ................................. 349/106–109
See application file for complete search history.

(56) References Cited

U.S. PATENT DOCUMENTS

| | | | |
|---|---|---|---|
| 5,451,980 A | 9/1995 | Simon et al. | |
| 5,570,139 A | 10/1996 | Wang | |
| 5,973,316 A | 10/1999 | Ebbesen et al. | |
| 5,986,808 A | 11/1999 | Wang | |
| 5,991,000 A | 11/1999 | Shimabukuro et al. | |
| 6,040,936 A * | 3/2000 | Kim et al. | 359/245 |
| 6,097,456 A | 8/2000 | Wang | |
| 6,122,091 A | 9/2000 | Russell et al. | |
| 6,236,033 B1 * | 5/2001 | Ebbesen et al. | 250/216 |
| 6,285,020 B1 | 9/2001 | Kim et al. | |
| 6,441,298 B1 | 8/2002 | Thio | |
| 6,992,826 B2 | 1/2006 | Wang | |
| 7,085,220 B2 | 8/2006 | Fujikata et al. | |
| 7,110,154 B2 | 9/2006 | Ballato et al. | |
| 7,206,114 B2 | 4/2007 | Ballato et al. | |
| 7,248,297 B2 | 7/2007 | Catrysse et al. | |
| 7,417,219 B2 | 8/2008 | Catrysse et al. | |
| 7,420,156 B2 | 9/2008 | Kim et al. | |

(Continued)

FOREIGN PATENT DOCUMENTS

| | | |
|---|---|---|
| CN | 101256246 A | 9/2008 |
| KR | 10-2008-0003086 A | 1/2008 |
| KR | 10-2009-0113516 A | 11/2009 |

OTHER PUBLICATIONS

Inoue et al., "RGB Color Filter Comprising Aluminum Film with Surface Plasmon Enhanced Transmission through Sub-Wavelength Hole-Arrays," Optical MEMS and Nanophotonics, IEEE/LEOS International Conference, Aug. 2009, pp. 150-151.

(Continued)

*Primary Examiner* — Bumsuk Won
*Assistant Examiner* — Charles Chang
(74) *Attorney, Agent, or Firm* — Birch, Stewart, Kolasch & Birch, LLP

(57) ABSTRACT

Discussed are a color filter using a surface plasmon, a liquid crystal display (LCD) device and a method for fabricating the same, capable of enhancing a transmittance rate of an LC panel, by forming a transmissive pattern having a plurality of sub-wavelength holes having a period at a metal layer so that light of a specific wavelength can be selectively transmitted, and capable of simplifying the entire processed.

29 Claims, 17 Drawing Sheets

(56) References Cited

U.S. PATENT DOCUMENTS

| | | |
|---|---|---|
| 2003/0076456 A1* | 4/2003 | Lee et al. .................... 349/106 |
| 2005/0018125 A1* | 1/2005 | Hiruma ........................ 349/189 |
| 2006/0284829 A1 | 12/2006 | Moriyama et al. |
| 2009/0027329 A1 | 1/2009 | Choi et al. |
| 2009/0034055 A1 | 2/2009 | Gibson |
| 2009/0087793 A1 | 4/2009 | Kim et al. |
| 2009/0091644 A1 | 4/2009 | Mackey |

OTHER PUBLICATIONS

Wang, "Surface Plasma Tunable Color Filter and Display Device," Dec. 31, 1997, pp. 57-59.

* cited by examiner

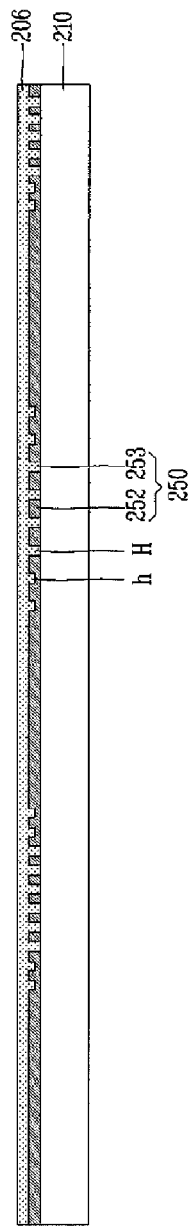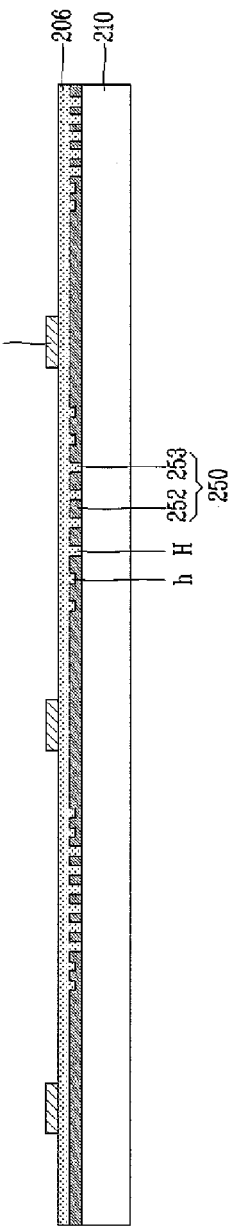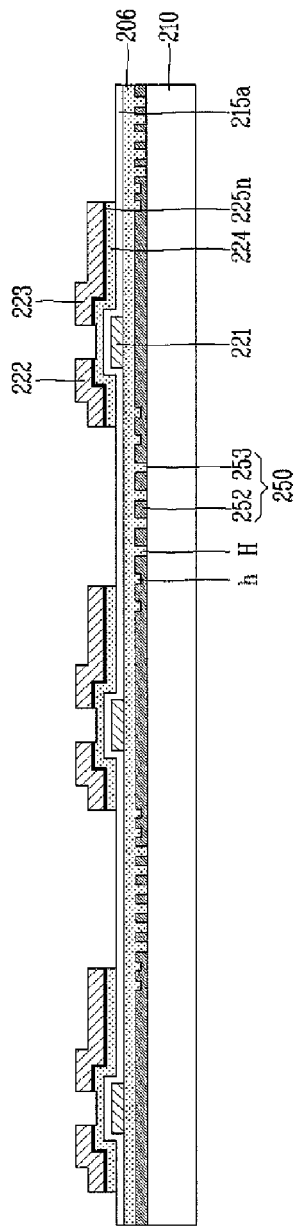

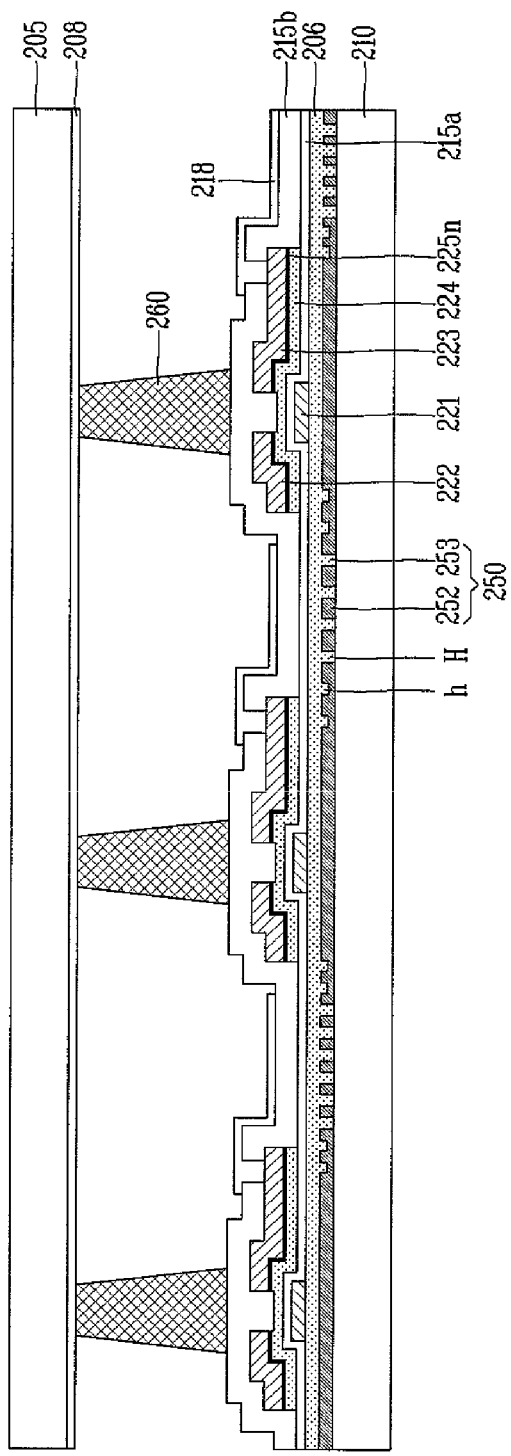

COLOR FILTER USING SURFACE PLASMON, LIQUID CRYSTAL DISPLAY DEVICE AND METHOD FOR FABRICATING THE SAME

CROSS-REFERENCE TO RELATED APPLICATION

Pursuant to 35 U.S.C. §119(a), this application claims the benefit of earlier filing date and right of priority to Korean Application 10-2009-0127433, filed on Dec. 18, 2009, the content of which is incorporated by reference herein in its entirety.

BACKGROUND OF THE INVENTION

1. Field of the Invention

The present invention relates to a color filter using a surface plasmon, a liquid crystal display (LCD) device and a method for fabricating the same, and more particularly, to a color filter using a surface plasmon and having a three-dimensional (3D) pattern structure provided with a transmissive pattern for selectively transmitting light of a specific wavelength, an LCD device and a method for fabricating the same.

2. Discussion of the Related Art

As concerns about an information displays and demands for portable information media are increased, research and commercialization of flat panel displays (FPD) replacing the general display apparatus, Cathode Ray Tubes (CRT) are actively ongoing. One of these flat panel displays, a Liquid Crystal Display (LCD) device serves to display an image by using optical anisotropy of a liquid crystal (LC). Owing to an excellent resolution, color reproduction characteristic, and picture quality, the LCD device is being actively applied to a notebook, a desk top monitor, etc.

The LCD device is largely comprised of a color filter substrate, an array substrate, and an LC layer interposed between the color filter substrate and the array substrate.

The LCD device is fabricated through a plural number of mask processes (i.e., photo lithography process). Accordingly, required is a method for reducing the number of mask processes for enhanced productivity.

Hereinafter, a structure of the related art LCD device will be explained in more detail with reference to FIG. 1.

FIG. 1 is a disassembled perspective view schematically showing a structure of the related art LCD.

As shown in FIG. 1, the LCD device largely comprises a color filter substrate 5, an array substrate 10, and an LC layer 30 interposed between the color filter substrate 5 and the array substrate 10.

The color filter substrate 5 consists of a color filter (C) composed of a plurality of sub color filters 7 for implementing red, green and blue (RGB) colors, a black matrix 6 for dividing the sub color filters 7 from each other and shielding light passing through the LC layer 30, and a transparent common electrode 8 for applying a voltage to the LC layer 30.

The array substrate 10 consists of a plurality of gate lines 16 and data lines 17 arranged in horizontal and vertical directions to define a plurality of pixel regions (P), Thin Film Transistors (TFT), switching devices formed at intersections between the gate lines 16 and the data lines 17, and pixel electrodes 18 formed in the pixel regions (P).

The color filter substrate 5 and the array substrate 10 facing each other are bonded to each other by a sealant (not shown) formed on an outer periphery of an image display region, thereby constituting an LC panel. The color filter substrate 5 and the array substrate 10 are bonded to each other by alignment keys (not shown) formed at the color filter substrate 5 or the array substrate 10.

In order to prevent light leakage due to an alignment error when bonding the two substrates to each other, a line width of the black matrix is set to be wide, thereby obtaining an alignment margin. This may reduce an aperture ratio of the LC panel.

The general color filter used in the LCD device implements colors by absorbing light of unnecessary colors for disappearance with using pigments or dyes, and by selectively transmitting light of desired colors. This may allow only one of RGB colors, from white incident light, to be transmitted to one sub-pixel. Accordingly, it is difficult to have a transmittance rate more than 30%. Due to this low transmittance rate of the LC panel, power consumption by a backlight is increased.

FIG. 2 is an exemplary view schematically showing a transmittance rate of the LC panel when applying a color filter using a general pigment dispersing method.

Referring to FIG. 2, as light incident from a backlight has a decreased optical amount decreased while sequentially passing through a polarizer, a TFT array, an LC and a color filter, a transmittance rate is reduced to 5% or less than.

Here, the polarizer, the TFT array and the color filter approximately have transmittance rates of ~40%, 45~55% and ~25%, respectively.

The general color filter is fabricated with complicated processes since it repeatedly undergoes color resist coating, exposure to light, development and hardening processes according to each color.

Furthermore, in order to fabricate the color filter on the color filter substrate, color filter processing lines have to be implemented separately from TFT processing lines. This may increase line installation costs.

SUMMARY OF THE INVENTION

Therefore, one object of the present invention is to provide a color filter using a surface plasmon, a liquid crystal display (LCD) device and a method for fabricating the same, capable of enhancing an aperture ratio and a transmittance rate of an LC panel, by using a surface plasmon instead of using the general dyes or pigments.

Another object of the present invention is to provide a color filter using a surface plasmon, a liquid crystal display (LCD) device and a method for fabricating the same, capable of enhancing dependency of a prime peak wavelength of transmitted light on a viewing angle, and capable of enhancing a transmittance rate and collimation.

Still another object of the present invention is to provide a color filter using a surface plasmon, a liquid crystal display (LCD) device and a method for fabricating the same, capable of preventing light divergence to an interface between sub-pixels.

Yet still another object of the present invention is to provide a color filter using a surface plasmon, a liquid crystal display (LCD) device and a method for fabricating the same, capable of simplifying the entire processes and reducing installation costs by using the color filter as a common electrode or a back electrode, or by forming the color filter on a lower array substrate together with a switching device.

To achieve these and other advantages and in accordance with the purpose of the present invention, as embodied and broadly described herein, there is provided a color filter using a surface plasmon, comprising: a metal layer; a transmissive pattern formed in the metal layer, and consisting of a plurality of sub-wavelength holes having a period; and a plurality of non-penetrating grooves formed at a region encompassing the plurality of holes, wherein a desired color is implemented by selectively transmitting light of a specific wavelength by using a surface plasmon.

To achieve these and other advantages and in accordance with the purpose of the present invention, as embodied and broadly described herein, there is also provided a liquid crystal display (LCD) device, comprising: a color filter formed on a first substrate, having a transmissive pattern formed in a metal layer and consisting of a plurality of sub-wavelength holes having a period, and having a plurality of non-penetrating grooves formed at a region encompassing the plurality of holes, for implementing a desired color by selectively transmitting light of a specific wavelength; a thin film transistor (TFT) formed on the color filter; and a second substrate bonded to the first substrate with facing the first substrate, wherein the second substrate includes no color filter and no black matrix.

According to another aspect of the present invention, there is provided a liquid crystal display (LCD) device, comprising: a color filter formed on an outer surface of a first substrate, having a transmissive pattern formed in a metal layer and consisting of a plurality of sub-wavelength holes having a period, and having a plurality of non-penetrating grooves formed at a region encompassing the plurality of holes, for implementing a desired color by selectively transmitting light of a specific wavelength; a thin film transistor (TFT) formed on an inner surface of the first substrate; and a second substrate bonded to the first substrate with facing the first substrate, wherein the second substrate includes no color filter and no black matrix.

According to still another aspect of the present invention, there is provided a liquid crystal display (LCD) device, comprising: a thin film transistor (TFT) formed on a first substrate; and a color filter formed on a second substrate, having a transmissive pattern formed in a metal layer and consisting of a plurality of sub-wavelength holes having a period, and having a plurality of non-penetrating grooves formed at a region encompassing the plurality of holes, for implementing a desired color by selectively transmitting light of a specific wavelength, wherein the first substrate is bonded to the second substrate with facing the second substrate, and the color filter replaces a common electrode or a back electrode.

To achieve these and other advantages and in accordance with the purpose of the present invention, as embodied and broadly described herein, there is still also provided a method for fabricating a liquid crystal display (LCD) device, the method comprising: providing first and second substrates; forming, on the first substrate, a color filter having a transmissive pattern formed in a metal layer and consisting of a plurality of sub-wavelength holes having a period, the color filter for implementing a desired color by selectively transmitting light of a specific wavelength; forming a plurality of non-penetrating grooves formed at a region encompassing the plurality of holes; forming a thin film transistor (TFT) on the color filter; and bonding the first substrate and the second substrate to each other, wherein the second substrate includes no color filter and no black matrix.

According to another aspect of the present invention, there is provided a method for fabricating a liquid crystal display (LCD) device, the method comprising: providing first and second substrates; forming, on an outer surface of the first substrate, a color filter having a transmissive pattern formed in a metal layer and consisting of a plurality of sub-wavelength holes having a period, the color filter for implementing a desired color by selectively transmitting light of a specific wavelength; forming a plurality of non-penetrating grooves formed at a region encompassing the plurality of holes; forming a thin film transistor (TFT) on an inner surface of the first substrate; and bonding the first substrate and the second substrate to each other, wherein the second substrate includes no color filter and no black matrix.

According to still another aspect of the present invention, there is provided a method for fabricating a liquid crystal display (LCD) device, the method comprising: providing first and second substrates; forming a thin film transistor on the first substrate; forming, on the second substrate, a color filter having a transmissive pattern formed in a metal layer and consisting of a plurality of sub-wavelength holes having a period, the color filter for implementing a desired color by selectively transmitting light of a specific wavelength; forming a plurality of non-penetrating grooves formed at a region encompassing the plurality of holes; and bonding the first substrate and the second substrate to each other, wherein the color filter replaces a common electrode or a back electrode.

The plurality of holes may have a period, and the plurality of non-penetrating grooves having no period may be further formed near the plurality of holes having a period.

A horizontal sectional surface of the hole may have one of a circular shape, a quadrangular shape, a triangular shape, an oval shape, and a slit shape having an aspect ratio more than one, and a horizontal sectional surface of the groove may have one of a circular shape, a quadrangular shape, a triangular shape, an oval shape, and a slit shape having an aspect ratio more than one.

The metal layer may be formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

The hole may have a size of 50 nm~10 μm, and the groove may have a size of 50 nm~10 μm.

The holes may have a period of 50 nm~10 μm, and the grooves may have a period of 50 nm~10 μm.

The method may further comprise forming an insulating layer, on the metal layer and inside the plurality of holes and grooves, with the same dielectric material as the first and second substrates.

In case of using glass substrates as the first and second substrates, the insulating layer may be formed of $SiO_2$, and may be formed to have a thickness of 10 nm~100 μm.

The metal layer may be formed by using one of a gas phase method, a liquid phase method, a solid phase method, and a nanosol coating method.

The transmissive pattern may be formed by using one of an e-beam lithography, an ion beam milling, a nanosphere lithography, a nano imprinting, a photolithography, and a laser interference lithography.

The transmissive pattern may be divided into a plurality of regions having different hole periods. The grooves may be formed by one of an etching process, a milling process, and a metal deposition process.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 12A to 12F are sectional views sequentially showing processes for fabricating the LCD device of FIG. 10.

DETAILED DESCRIPTION OF THE INVENTION

Description will now be given in detail of embodiments of the present invention, with reference to the accompanying drawings.

For the sake of brief description with reference to the drawings, the same or equivalent components will be provided with the same reference numbers, and description thereof will not be repeated.

Hereinafter, a color filter using a surface plasmon, a liquid crystal display (LCD) device and a method for fabricating the same according to the present invention will be explained in more detail with reference to the attached drawings.

The general method for enhancing a transmittance ratio of an LC panel by improving an aperture ratio of an array substrate has many limitations. Accordingly, the general paradigm has to be changed into a new paradigm for enhancing a transmittance ratio of an LC panel by removing a color filter.

For this, has been proposed a method for filtering light by forming a transmissive pattern at a metal layer so that light of a specific wavelength can be selectively transmitted. The present invention is to provide a color filter capable of transmitting RGB colors by forming a metal layer using a surface plasmon.

Figure 1:
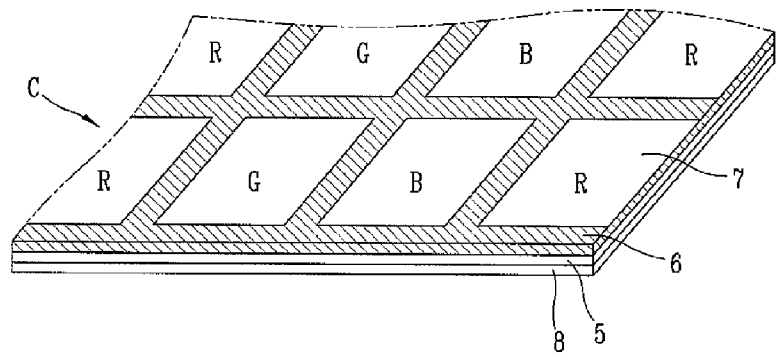
FIG. 1 is a disassembled perspective view schematically showing a structure of a liquid crystal display (LCD) device in accordance with the related art.
Figure 1:
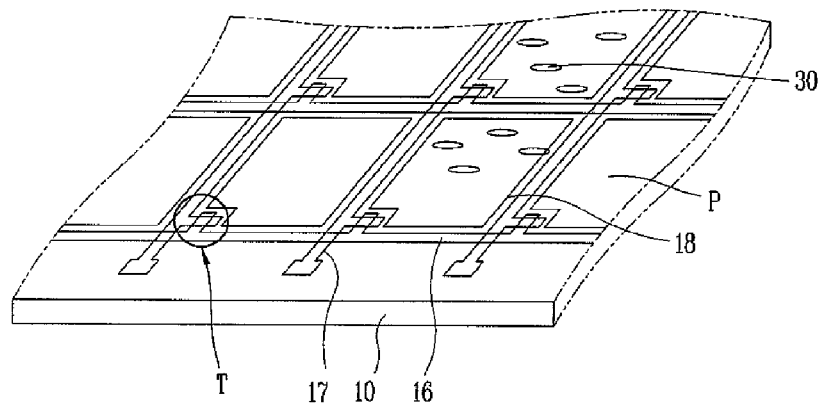
Figure 2:
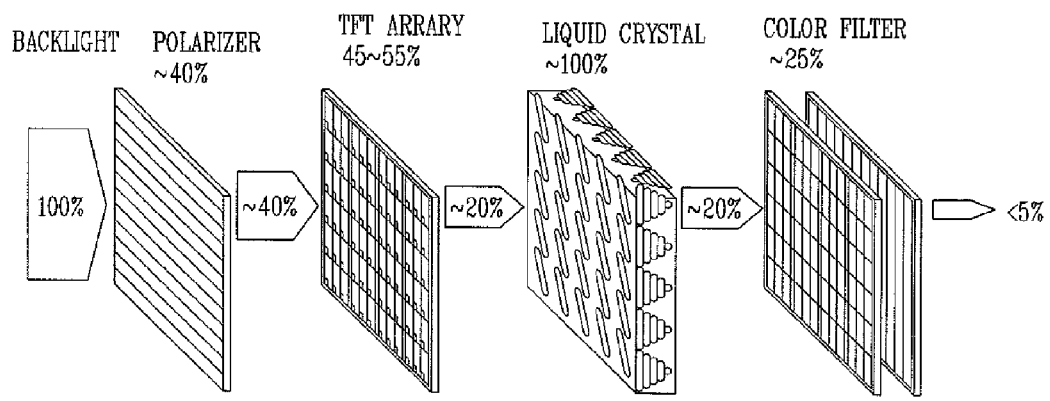
FIG. 2 is an exemplary view schematically showing a transmittance rate of an LC panel when applying a color filter using a general pigment dispersing method.
Figure 3A:
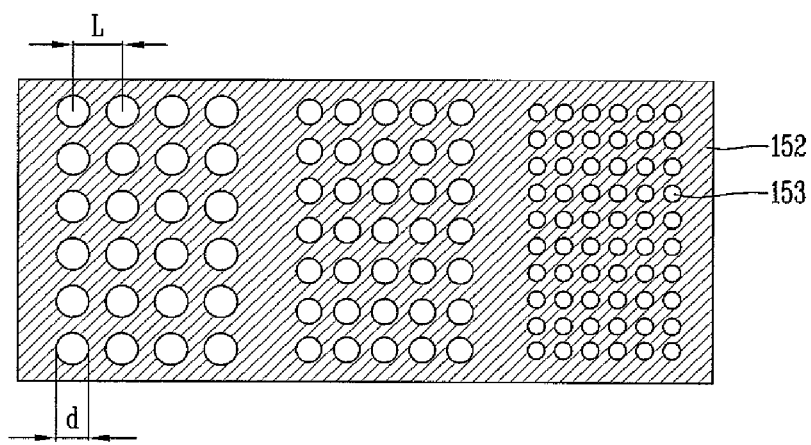
FIGS. 3A and 3B are respectively a planar view and a sectional view, which schematically show a structure of a color filter using a surface plasmon according to a first embodiment of the present invention.
Figure 3B:
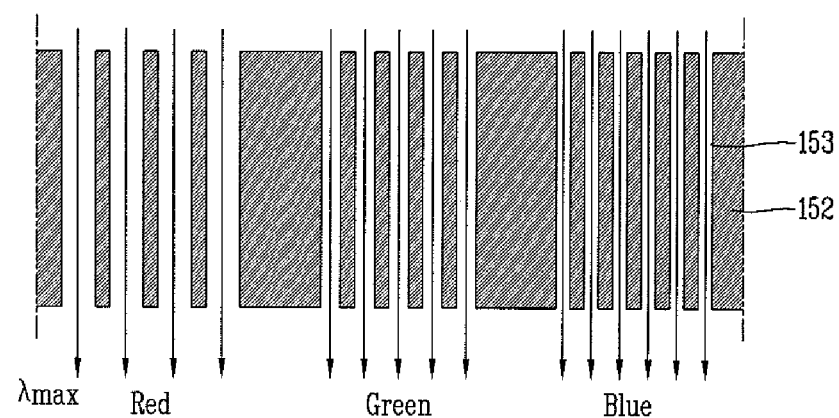

FIGS. 3A and 3B are respectively planar and sectional views schematically showing a structure of a color filter fabricated by using a surface plasmon phenomenon according to the present invention.

Referring to FIG. 3, a transmissive pattern 153 consisting of a plurality of sub-wavelength holes having a predetermined period (L) is formed in a metal layer 152. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

For instance, if a sub-wavelength hole pattern having a predetermined period (L) is formed on a silver film, selected RGB light of specific wavelengths is transmitted according to a size (d) and a period (L) of a hole, thereby implementing RGB colors. A greater amount of light than that of light illuminating on a hole area may be transmitted by absorbing light near the hole.

In order to implement a color of a high purity, each thickness of the metal layer 152 corresponding to each wavelength may be differently controlled. However, the present invention is not limited to this.

For your reference, the plasmon refers to a quasiparticle that free electrons induced on a surface of metal oscillate collectively by an electric field of incident light. A surface plasmon indicates that the plasmon partially exists on the metal surface, which corresponds to an electromagnetic wave that proceeds along an interface between the metal and a dielectric.

The surface plasmon phenomenon refers to forming light of a specific wavelength as light of a specific wavelength incident onto a surface of metal having a nano-sized periodic hole pattern resonates with free electrons on the metal surface. Only light of specific wavelengths is made to transmit through the hole, and light of other wavelengths is made to be reflected from the metal surface.

Generally, a thick metal layer can not transmit incident light. If a hole formed at the metal layer has a size much smaller than a wavelength of incident light, an intensity of transmitted light is significantly decreased. However, if the sub-wavelength small holes are periodically arranged at the metal layer, a transmittance ratio of light is significantly increased due to excitation of a surface plasmon. Generally, a dispersion curve of light or photon does not cross a dispersion curve of a surface plasmon. In order to directly couple the photon to the surface plasmon, a grating structure of a hole pattern having a predetermined period is formed on the surface of the metal layer. This may satisfy the conservation of momentum, thereby causing the surface plasmon to be excited.

By controlling the transmissive pattern, i.e., a size and period of the hole and a thickness of the metal layer, etc., light of a desired wavelength may be transmitted. In case of a metal layer provided with a square structure with holes having a period of 'a', a prime peak wavelength of light perpendicularly incident onto the metal layer, i.e., a surface plasmon resonance wavelength may be obtained by the following Equation 1.

$$\lambda_{spp} = L\sqrt{\frac{\varepsilon_m \varepsilon_d}{\varepsilon_m + \varepsilon_d}} \quad \text{[Equation 1]}$$

Here, $\varepsilon_m$ indicates a dielectric constant of metal, and $\varepsilon_d$ indicates a dielectric constant of a dielectric material adjacent to the metal. That is, a peak wavelength of light transmitted by a surface plasmon may be controlled by changing a period of a transmissive pattern or by changing a dielectric material.

The transmissive pattern may have not only a circular shape such as a hole, but also various shapes such as an oval shape, a quadrangular shape, a triangular shape, and a slit shape. When the transmissive pattern has a circular shape, the hole may have a diameter of 50 nm~10 µm and a period of 50 nm~10 µm.

In the color filter using a surface plasmon according to the first embodiment of the present invention, a bandwidth and a position of a prime peak wavelength of transmitted light are greatly influenced by a viewing angle.

Figure 4:
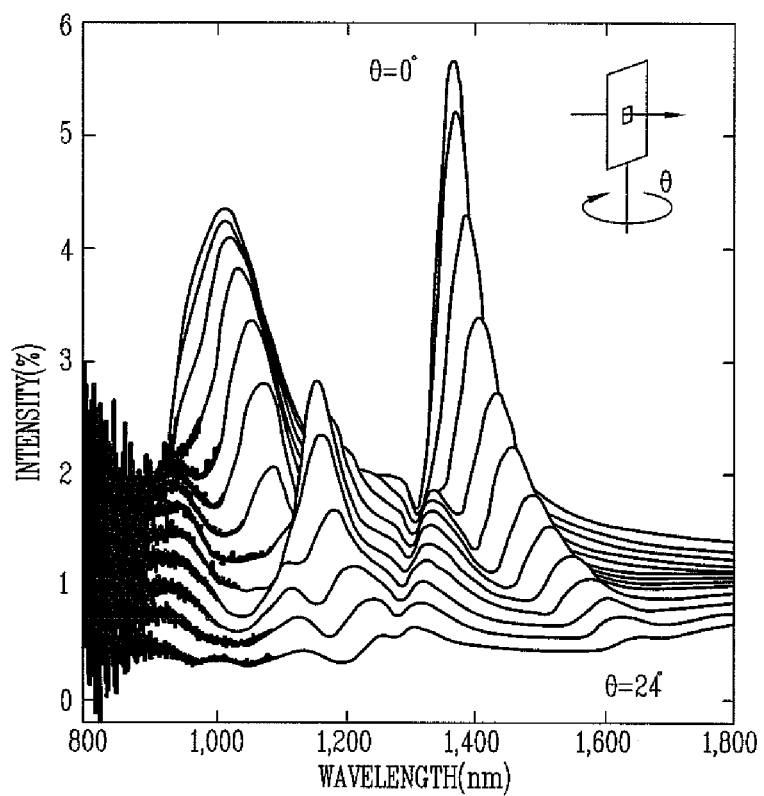
FIG. 4 is a graph showing changes of a prime peak wavelength of transmitted light according to an incident angle.

FIG. 4 is a graph showing changes of a prime peak wavelength of transmitted light according to an incident angle, which shows a transmission intensity of transmitted light measured when an incident angle ($\theta$) is changed to 0°~24° (T. Ebbesen, et al, Nature, 667, 1998).

As shown in FIG. 4, a bandwidth and a position of a prime peak wavelength of transmitted light are greatly influenced by a viewing angle. The prime peak wavelength of transmitted light by a surface plasmon resonance has a change rate of 8.3 nm/° degree.

It can be seen that light perpendicularly incident onto the color filter has a maximized transmission rate, and the transmission rate is significantly decreased when the incidence angle ($\theta$) is increased.

This may cause a problem that a color of a desired wavelength can be implemented by using a specific optical source having a narrow incidence angle.

Figure 5A:
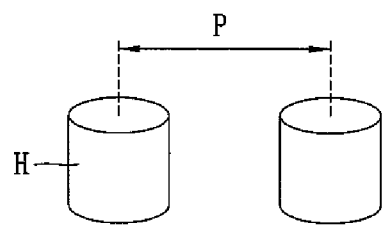
FIGS. 5A and 5B are exemplary views showing changes of a hole period due to a difference of a viewing angle.
Figure 5B:
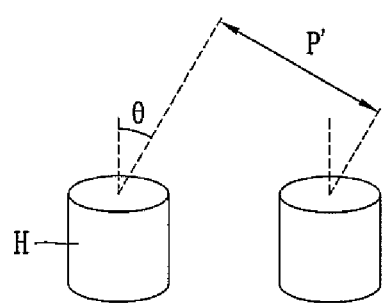

FIGS. 5A and 5B are exemplary views showing changes of a hole period due to a difference of a viewing angle, which show changes of a hole period when light is incident with incidence angles of 90° and $\theta$, respectively.

Referring to FIGS. 5A and 5B, under an assumption that a gap between two holes (H) adjacent to each other is 'P', if an incidence angle ($\theta$) is changed, an effective grating period is changed to 'P×cos $\theta$'. Under an assumption that each hole (H) has an area of 'A', an effective sectional area is changed to 'A×cos $\theta$'. As the incidence angle ($\theta$) is increased, an effective sectional area of the hole (H) through which incident light can pass is decreased. This may cause a transmission rate to be decreased. Furthermore, as a viewing angle is increased, an effective grating period and a diameter of the hole (H) are decreased. This may cause a position of a prime peak wavelength of transmitted light by a surface plasmon resonance to be changed.

An object of the second embodiment of the present invention is to fabricate a color filter using a surface plasmon emitted from a surface in the form of beam with an enhanced transmittance rate, and enhanced collimation and directivity.

More concretely, the color filter using a surface plasmon according to the second embodiment of the present invention has a plurality of grooves having a period and formed at a region encompassing the plurality of holes of the transmissive pattern. This may implement beam having a very narrow divergence angle of about ±3°. This may reduce dependency of a prime peak wavelength of transmitted light on a viewing angle, and enhance a transmittance rate and collimation.

In the second embodiment of the present invention, a prime peak wavelength of transmitted light is not influenced by changes of a viewing angle or a measuring angle. Furthermore, since light divergence to an interface between sub-pixels is prevented, loss of transmitted light may be reduced. Besides, since color mixture between the sub-pixels adjacent to each other does not occur, a partition wall such as a black matrix may not be required, and the pixel may be formed in a small nano-size. This will be explained in more detail with reference to the drawings.

Figure 6A:
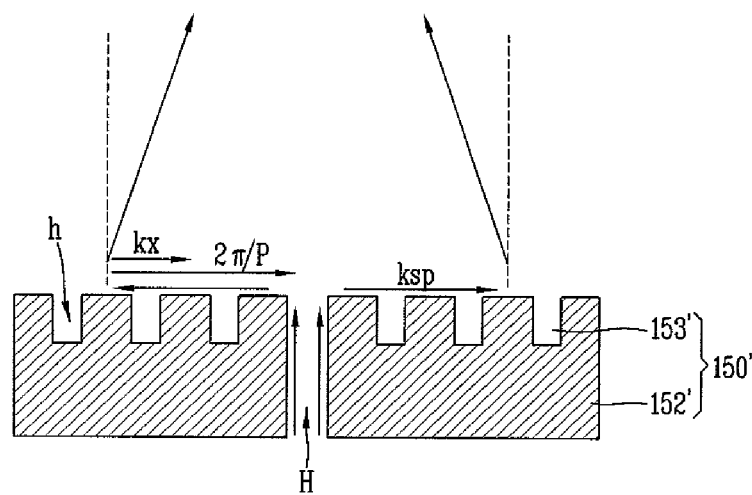
FIGS. 6A and 6B are sectional views showing concepts to collimate and diverge light at an outlet of a color filter using a surface plasmon.
Figure 6B:
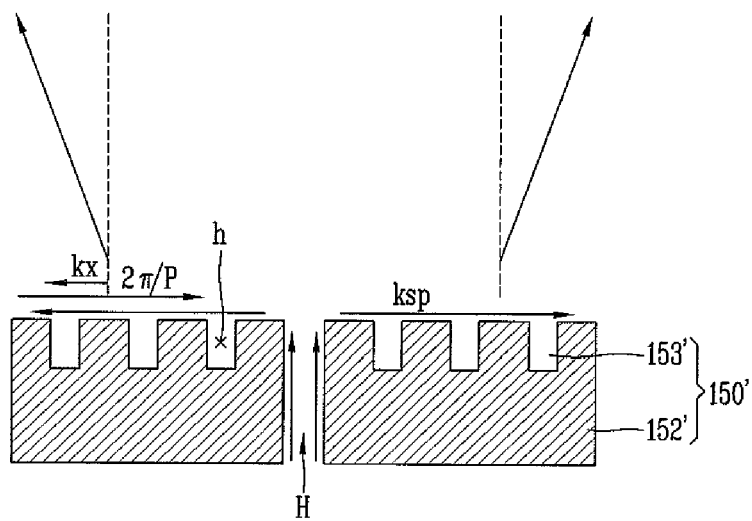

FIGS. 6A and 6B are sectional views showing concepts to collimate and diverge light at an outlet of a color filter using a surface plasmon.

As shown in FIGS. 6A and 6B, directivity of light emitted from a metal layer 152' and a type of transmitted light may be determined by forming a groove (h) pattern at an outlet of a metal layer 152'.

Since reinforcing interference may occur among surface plasmon waves due to the grooves (h) periodically formed on the surface of the metal layer 152', the intensity of transmitted light is increased, i.e., the transmission rate is increased. The grooves (h) may be periodically patterned on the surface of the metal layer 152' by an etching process, a milling process, a metal deposition process, etc.

More concretely, light incident onto the color filter 150' passes through the hole (H) having a nano-size in a surface plasmon-coupled manner. Light emitted from the outlet is separated from a surface plasmon at the outlet, thereby being out of the range of the metal layer 152'. If a plurality of grooves (h) are formed at the outlet with a period (P), surface plasmons are induced from the respective grooves (h). And, the light emitted from the outlet and separated from the surface plasmons is interfered with each other. Light emitted from the metal layer 152' in a condition that a wave vector ($k_{sp}$) by a surface plasmon is less than a grating vector ($2\pi/P$) proceeds in the form of two beams converged to each other as shown in FIG. 8A. If the wave vector is equal to the grating vector, transmitted light proceeds in the form of beams collimated in parallel.

Figure 7A:
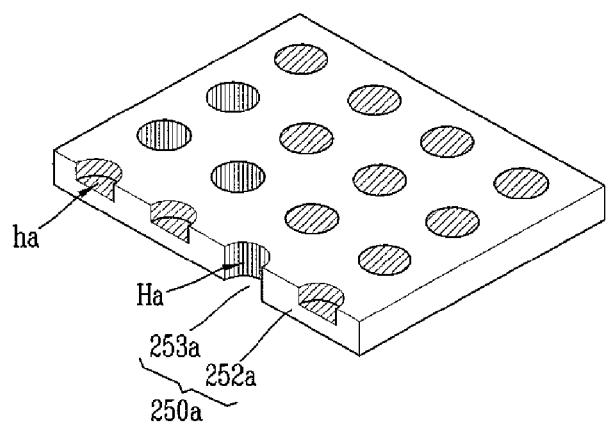
FIGS. 7A to 7C are views showing grooves of a color filter using a surface plasmon according to a second embodiment of the present invention.
Figure 7B:
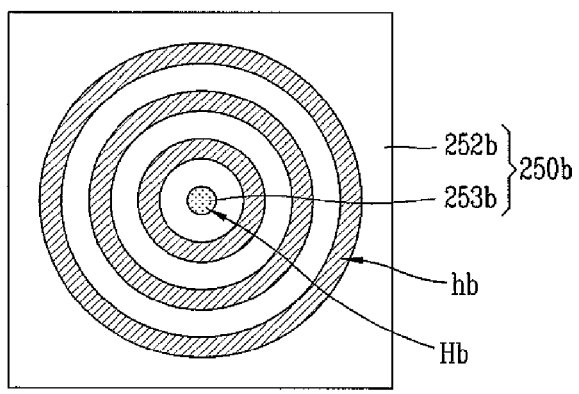
Figure 7C:
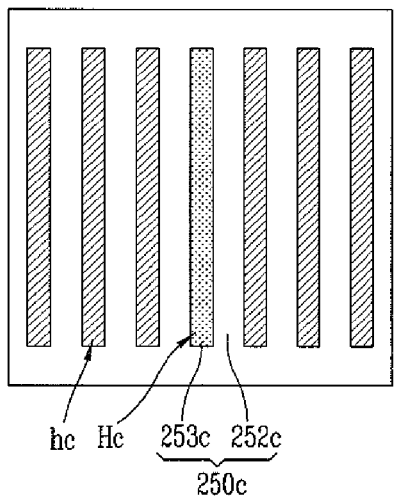

As shown in FIGS. 7A to 7C, the grooves may be implemented as non-penetrating dimples, non-penetrating rings, and non-penetrating slits.

Referring to FIGS. 7A to 7C, transmissive patterns 253a~253c consisting of a plurality of sub-wavelength holes (Ha~Hc) having a period are formed in metallic films 252a~252c, and a plurality of grooves (ha~hc) having a period are formed at a region encompassing the plurality of holes (Ha~Hc). This may implement beam having a very narrow divergence angle in a condition that a wave vector is smaller than a grating vector.

Figure 8:
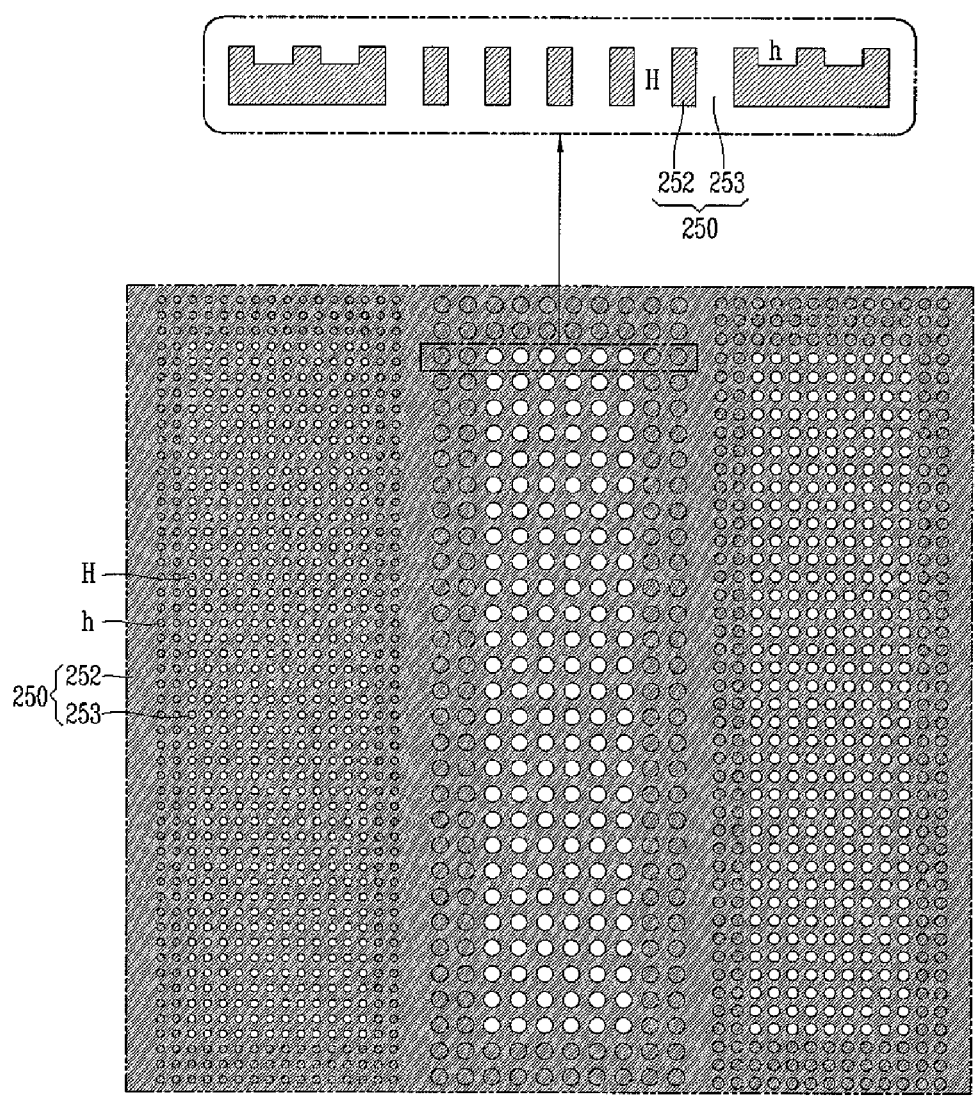
FIG. 8 is a planar view and a sectional view schematically showing a color filter using a surface plasmon according to a second embodiment of the present invention.

FIG. 8 is a planar view and a sectional view schematically showing a color filter using a surface plasmon according to a second embodiment of the present invention, in which a plurality of circular grooves having a period are formed at a region encompassing a plurality of holes.

FIG. 8 shows one pixel composed of sub-color filters corresponding to blue, red and green colors from the left side. However, the present invention is not limited to this. That is, the present invention may be also applied to implement multicolors more than three colors.

As shown, a color filter 250 according to a second embodiment of the present invention is implemented as a transmissive pattern 253 consisting of a plurality of sub-wavelength holes (H) having a predetermined period in directions of rows and columns are formed in a metal layer 252. The color filter 250 implements desired colors by selectively transmitting light of a specific wavelength.

As a plurality of grooves (h) having a period are formed at a region encompassing the plurality of holes (H), dependency of a prime peak wavelength of transmitted light on a viewing angle may be reduced, and a transmittance rate and collimation may be enhanced.

The transmissive pattern 253 is formed in a pixel region except for a region where a gate line, a data line and a TFT are formed. A horizontal sectional surface of the hole (H) of the transmissive pattern 253 may have one of a quadrangular shape, a triangular shape, an oval shape, and a slit shape having an aspect ratio more than one, as well as the illustrated circular shape. Here, the aspect ratio indicates a ratio between a length of a long axis and a length of a short axis of a predetermined figure. A horizontal sectional surface of the groove (h) may have one of a quadrangular shape, a triangular shape, an oval shape, and a slit shape having an aspect ratio more than one, as well as the illustrated circular shape.

The metal layer 252 is preferably formed of aluminum (Al) which can implement a surface plasmon resonance on the entire regions of visible rays. However, the present invention is not limited to this. More concretely, the metal layer 252 may be formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

In case of using aluminum having a thickness of 150 nm as the metal layer 252, in order to transmit blue light of a prime peak wavelength of 450 nm, the hole has a period of about 272 nm and a size of about 136 nm. In order to transmit red light of a prime peak wavelength of 650 nm, the hole has a period of about 394 nm and a size of about 197 nm. And, in order to transmit green light of a prime peak wavelength of 550 nm, the hole has a period of about 333 nm and a size of about 167 nm.

In order to implement a color of a high purity, each thickness of the metal layer 252 corresponding to each wavelength may be differently controlled. However, the present invention is not limited to this.

Preferably, the hole (H) of the transmissive pattern 253 has a size of 100 nm~300 nm. However, the present invention is not limited to this. That is, the hole (H) of the transmissive pattern 253 may have a size of 50 nm~10 µm, and a period of 50 nm~10 µm. Preferably, the groove (h) has a size of 100 nm~300 nm. However, the present invention is not limited to this. That is, the groove (h) may have a size of 50 nm~10 µm, and a period of 50 nm~10 µm.

Although not shown, non-penetrating grooves having no period may be formed near the non-penetrating grooves (h). If light is incident from a lower side of the color filter 250, only light of a specific wavelength determined by the period of the transmissive pattern 253 passes through the substrate. That is, when the transmissive pattern 253 has a period (a), a prime peak wavelength of transmitted light may be set as $\lambda=1.7 \times a$. The transmissive pattern 253 may be divided, in the same metal layer 252, into a plurality of regions having different periods. Light of different wavelengths may selectively pass through the divided regions.

The transmissive pattern consisting of a plurality of holes having a specific period and size is formed in the metal layer. The metal layer is used as a color filter by using a surface plasmon occurring therefrom, and the color filter is applied to an LCD device to implement colors.

The general color filter is formed on an upper substrate, a color filter substrate. However, the color filter using a surface plasmon according to the present invention may be formed on a lower array substrate, or outside the lower array substrate.

More concretely, the general color filter using pigments or dyes can not undergo a high temperature process. On the other hand, the color filter using a surface plasmon according to the present invention may undergo a high temperature process, because the metal layer serves as the color filter. This may allow a thin film transistor to be fabricated on the metal layer through the high temperature process. Furthermore, since the color filter is formed at the lower array substrate, can be solved the general problem, decrease of an aperture ratio occurring as an alignment margin is obtained when bonding the upper and lower substrates to each other.

Figure 9:
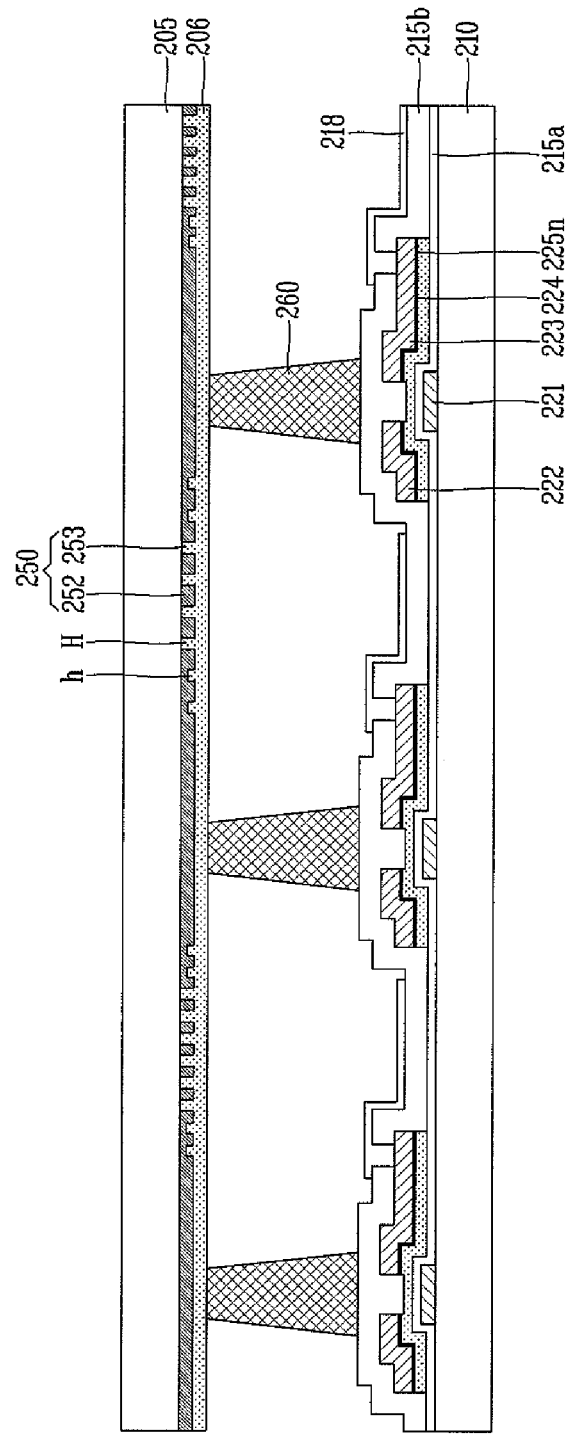
FIG. 9 is a sectional view schematically showing one structure of a liquid crystal display (LCD) device according to a second embodiment of the present invention.
Figure 10:
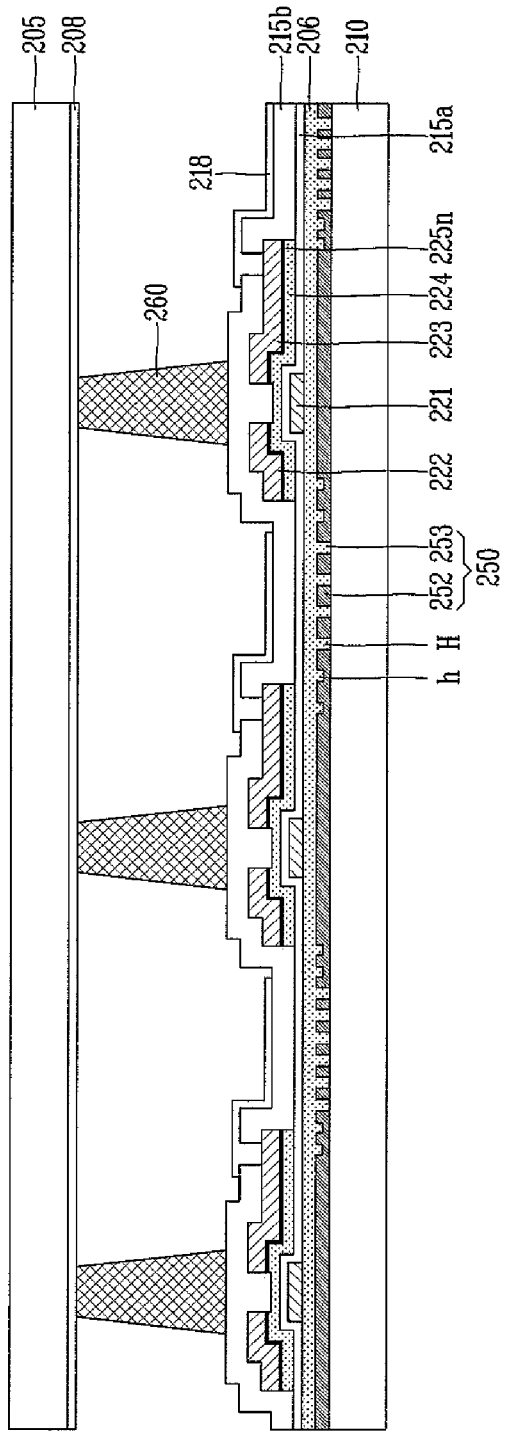
FIG. 10 is a sectional view schematically showing another structure of the LCD device according to a second embodiment of the present invention.

FIGS. 9 and 10 are sectional views schematically showing a structures of a liquid crystal display (LCD) device according to a second embodiment of the present invention. For convenience, the same components are provided with the same reference numeral.

As shown, the color filter according to the second embodiment of the present invention has the transmissive pattern formed in the metal layer and consisting of a plurality of sub-wavelength holes having a predetermined period in directions of rows and columns. The color filter implements desired colors by selectively transmitting light of a specific wavelength.

In the color filter according to the second embodiment of the present invention, the plurality of grooves (h) having a period are formed at a region encompassing the plurality of holes (H). This may reduce dependency of a prime peak wavelength of transmitted light on a viewing angle, and may enhance a transmittance rate and collimation.

In order to apply the color filter using a surface plasmon to an LCD device, as shown in FIG. 9, the color filter 250 according to the second embodiment of the present invention may be formed on an upper color filter substrate 205.

This is advantageous in that a transmissive pattern is formed on a single metal layer by one step process thus to implement RGB colors. And, the transmissive pattern is used instead of an upper common electrode or a back electrode, thereby simplifying the entire processes and reducing the fabrication costs.

As aforementioned, the color filter 250 using a surface plasmon is advantageous to a color purity and a transmittance ratio when refractive index matching has been performed among the dielectric materials near the metal layer 252. Accordingly, in case of forming the color filter 250 on a glass substrate, an insulating layer 206 formed of the same material as the glass substrate, such as $SiO_2$, is preferably formed on the metal layer 252 including the transmissive pattern 253.

The color filter substrate 205 is bonded to an array substrate 210 with facing each other, by a sealant (not shown) formed on an outer periphery of an image display region, in a state that a constant cell gap is maintained therebetween by a column spacer 260. The array substrate 210 consists of a plurality of gate lines (not shown) and data lines (not shown) arranged in horizontal and vertical directions to define a plurality of pixel regions, Thin Film Transistors (TFT), switching devices formed at intersections between the gate lines and the data lines, and pixel electrodes 218 formed in the pixel regions.

The TFT consists of a gate electrode 221 connected to the gate line, a source electrode 222 connected to the data line, and a drain electrode 223 connected to the pixel electrode 218. The TFT further includes a first insulating layer 215a for insulating the gate electrode 221 and the source/drain electrodes 222 and 223 from each other, and an active layer 224 for forming a conductive channel between the source electrode 222 and the drain electrode 223 by a gate voltage applied to the gate electrode 221. Reference numeral 215b indicates a second insulating layer, and reference numeral 225n indicates an ohmic-contact layer for ohmic-contacting between source/drain regions of the active layer 224 and the source/drain electrodes 222 and 223.

The color filter using a surface plasmon is not damaged during a high temperature process since the metal layer is used. With considering this, the color filter may be formed on the array substrate.

As shown in FIG. 10, the color filter 250 using a surface plasmon may be formed inside a cell, i.e., below a TFT array. Although not shown, the color filter 250 may be also formed outside the cell, i.e., on an outer surface of the array substrate 210.

A common electrode 208 except for a color filter and a black matrix may be formed on the color filter substrate 205. The color filter 250 formed on the array substrate 210 may be floated or grounded.

In case of forming the color filter 250 on the array substrate 210, a margin for aligning the color filter substrate 205 and the array substrate 210 is not required. This may allow an aperture ratio to be increased at the time of designing an LC panel, thereby enhancing a transmittance ratio of the LC panel. If the transmittance ratio of the LC panel is enhanced, brightness of a backlight may be decreased to reduce power consumption by the backlight.

As the power consumption by the backlight is reduced, multi color pixels can be implemented to obtain a high picture quality with real color reproduction.

In case of forming the color filter 250 on the array substrate 210 and removing color filter processing lines, the installation costs may be reduced by about 50%.

Hereinafter, a structure of an LCD device in case of forming the color filter using a surface plasmon on the array substrate, and a method for fabricating the same will be explained in more detail with reference to the attached drawings.

Figure 11:
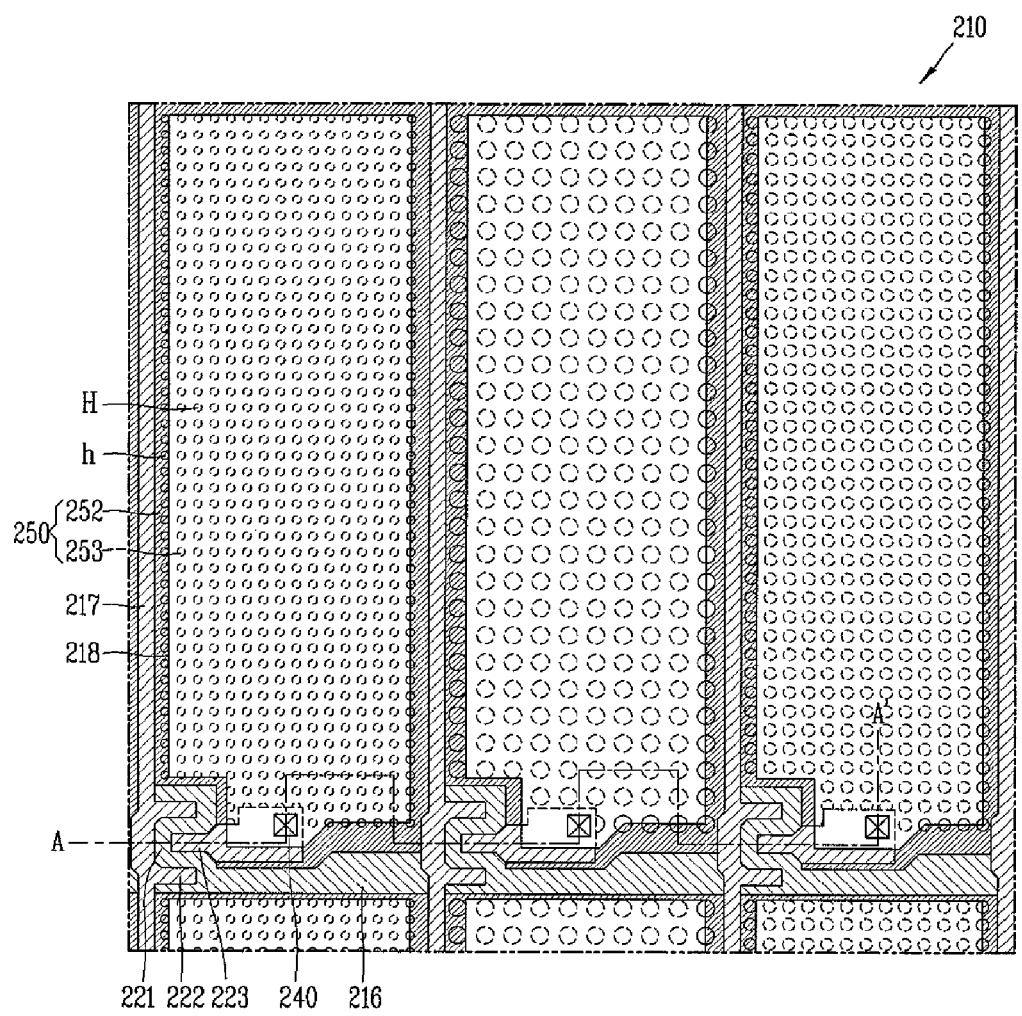
FIG. 11 is a planar view schematically showing a part of an array substrate of the LCD device of FIG. 10 according to a second embodiment of the present invention.

FIG. 11 is a planar view schematically showing a part of the array substrate of the LCD device shown in FIG. 10 according to a second embodiment of the present invention.

FIG. 11 shows one pixel composed of sub-color filters corresponding to blue, red and green colors from the left side. However, the present invention is not limited to this. That is, the present invention may be also applied to implement multi-colors more than three colors.

The sub-color filters corresponding to blue, red and green colors consist of the same components except for a structure of the color filter, i.e., a hole size and a period of the transmissive pattern.

The LCD device according to the present invention is a Twisted Nematic (TN) LCD device for driving nematic liquid crystal molecules in a direction perpendicular to a substrate. However, the present invention is not limited to this.

The array substrate 210 consists of a plurality of gate lines 216 and data lines 217 arranged in horizontal and vertical directions thereon to define a plurality of pixel regions. A thin film transistor (TFT), a switching device is formed at an intersection between the gate line 216 and the data line 217, and a pixel electrode 218 for driving an LC layer together with the common electrode 208 by being connected to the TFT is formed in the pixel region.

The TFT consists of a gate electrode 221 constituting a part of the gate line 216, a source electrode 222 connected to the data line 217, and a drain electrode 223 connected to the pixel electrode 218. The TFT further includes a first insulating layer (not shown) for insulating the gate electrode 221 and the source/drain electrodes 222 and 223 from each other, and an active layer (not shown) for forming a conductive channel between the source electrode 222 and the drain electrode 223 by a gate voltage applied to the gate electrode 221.

A part of the source electrode 222 is extending towards one direction to constitute a part of the data line 217. And, a part of the drain electrode 223 is extending towards the pixel region to be electrically connected to the pixel electrode 218 through a contact hole 240 of a second insulating layer (not shown).

The color filter 250 using a surface plasmon according to the second embodiment of the present invention is disposed on the array substrate 210. The color filter 250 has the transmissive pattern 253 formed in the metal layer 252 and consisting of a plurality of sub-wavelength holes having a predetermined period. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

The transmissive pattern 253 is formed in the pixel region except for a region where the gate line 216, the data line 217 and the TFT are formed.

In the color filter 250 according to the second embodiment of the present invention, the plurality of grooves (h) having a period are formed at a region encompassing the plurality of holes (H). This may enhance dependency of a prime peak wavelength of transmitted light on a viewing angle, and may enhance a transmittance rate and collimation.

A horizontal sectional surface of the hole (H) of the transmissive pattern 253 may have one of a circular shape, a quadrangular shape, a triangular shape, an oval shape, and a slit shape having an aspect ratio more than one. And, a horizontal sectional surface of the groove (h) may have one of a circular shape, a quadrangular shape, a triangular shape, an oval shape, and a slit shape having an aspect ratio more than one.

The metal layer 252 may be formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

In order to implement a color of a high purity, each thickness of the metal layer 252 corresponding to each wavelength may be differently controlled. However, the present invention is not limited to this.

Preferably, the hole (H) of the transmissive pattern 253 has a size of 100 nm~300 nm. However, the present invention is not limited to this. That is, the hole (H) of the transmissive pattern 253 may have a size of 50 nm~10 μm, and a period of 50 nm~10 μm. Preferably, the groove (h) has a size of 100 nm~300 nm. However, the present invention is not limited to this. That is, the groove (h) may have a size of 50 nm~10 μm, and a period of 50 nm~10 μm.

Although not shown, non-penetrating grooves having no period may be formed near the non-penetrating grooves (h).

FIGS. 12A to 12F are sectional views sequentially showing processes for fabricating the LCD device of FIG. 10, and FIGS. 13A to 13E are planar views sequentially showing processes for fabricating the array substrate of FIG. 11.

Figure 12D:
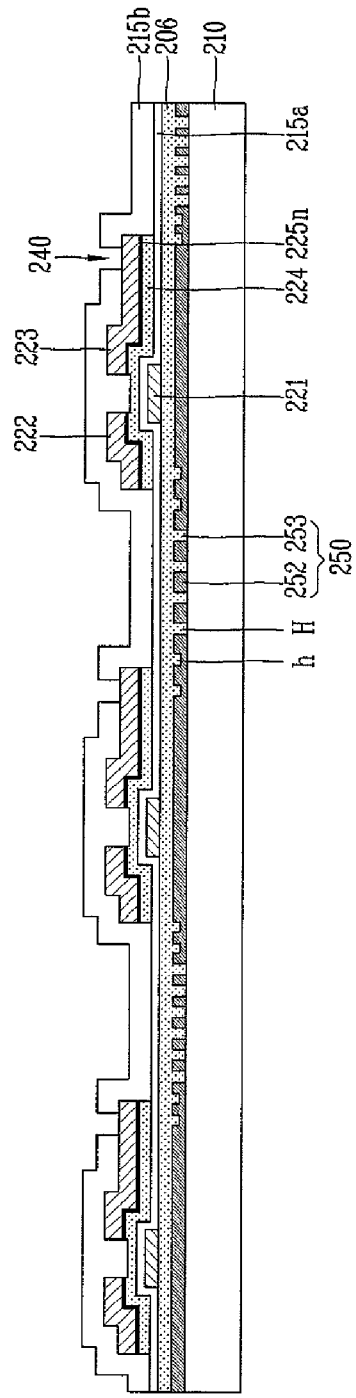
Figure 13A:
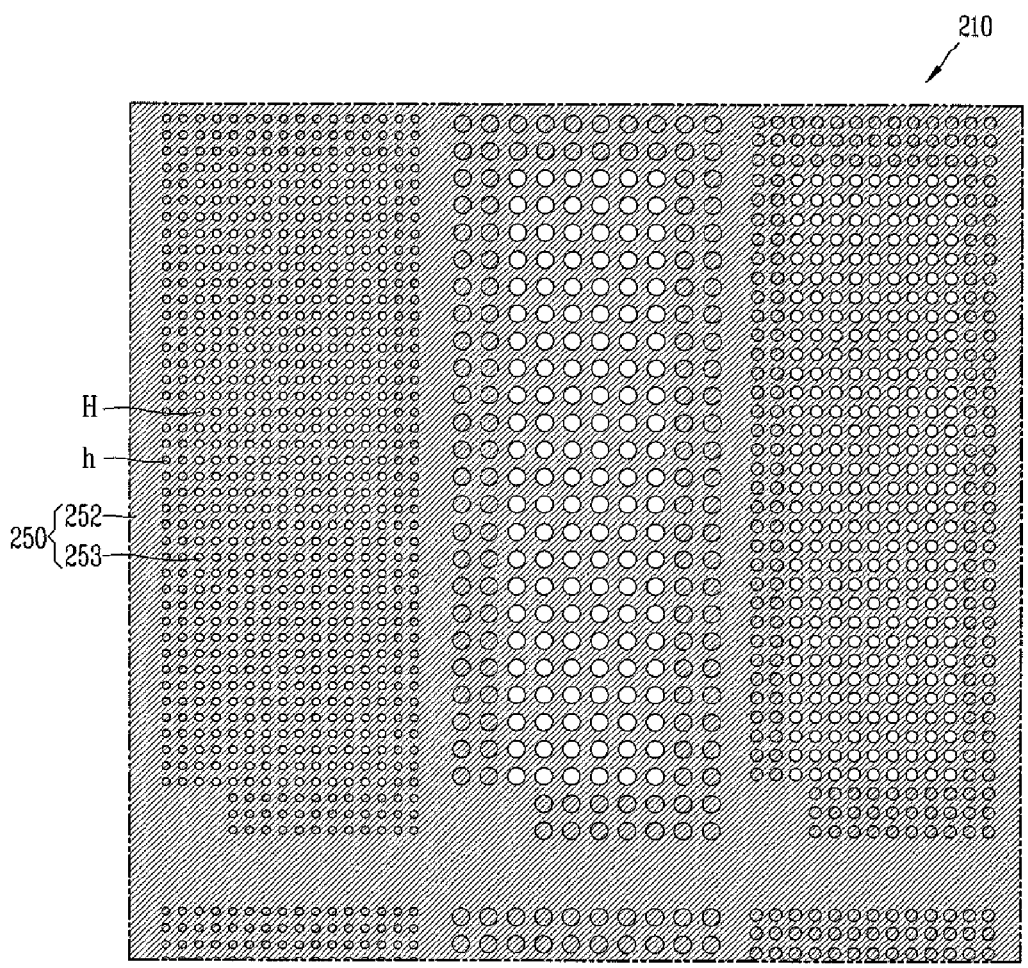
FIGS. 13A to 13E are planar views sequentially showing processes for fabricating the array substrate of FIG. 11.

As shown in FIGS. 12A and 13A, the color filter 250 using a surface plasmon according to the second embodiment of the present invention is formed on the array substrate 210 formed of a transparent insulating material such as glass.

The color filter 250 has the transmissive pattern 253 formed in the metal layer 252 and consisting of a plurality of sub-wavelength holes having a predetermined period. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

As a plurality of grooves (h) having a period are formed at a region encompassing the plurality of holes (H), dependency of a prime peak wavelength of transmitted light on a viewing angle may be reduced, and a transmittance rate and collimation may be enhanced.

A horizontal sectional surface of the hole (H) of the transmissive pattern 253 may have one of a circular shape, a quadrangular shape, a triangular shape, an oval shape, and a slit shape having an aspect ratio more than one. And, a horizontal sectional surface of the groove (h) may have one of a circular shape, a quadrangular shape, a triangular shape, an oval shape, and a slit shape having an aspect ratio more than one.

The metal layer 252 may be formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof. The metal layer 252 may be formed by using one of a gas phase method, a liquid phase method, a solid phase method, and a nanosol coating method. The transmissive pattern 253 may be formed by using one of an e-beam lithography, an ion beam milling, a nanosphere lithography, a nano imprinting, a photolithography, and a laser interference lithography.

In order to implement a color of a high purity, each thickness of the metal layer 252 corresponding to each wavelength may be differently controlled. However, the present invention is not limited to this.

Preferably, the hole (H) of the transmissive pattern 253 has a size of 100 nm~300 nm. However, the present invention is not limited to this. That is, the hole (H) of the transmissive pattern 253 may have a size of 50 nm~10 μm, and a period of 50 nm~10 μm. Preferably, the groove (h) has a size of 100 nm~300 nm. However, the present invention is not limited to this. That is, the groove (h) may have a size of 50 nm~10 μm, and a period of 50 nm~10 μm.

Although not shown, non-penetrating grooves having no period may be formed near the non-penetrating grooves (h).

Then, a dielectric material having a refractive index equal to or similar to that of the array substrate 210 is deposited above the metal layer 252 including the transmissive pattern 253, thereby forming an insulating layer 206 for planarizing the surface of the color filter 250.

The color filter 250 according to the second embodiment of the present invention implements RGB colors by selectively transmitting a blue color through a blue color transmissive pattern inside a blue color region, by selectively transmitting a red color through a red color transmissive pattern inside a red color region, and by selectively transmitting a green color through a green color transmissive pattern inside a green color region.

Figure 13B:
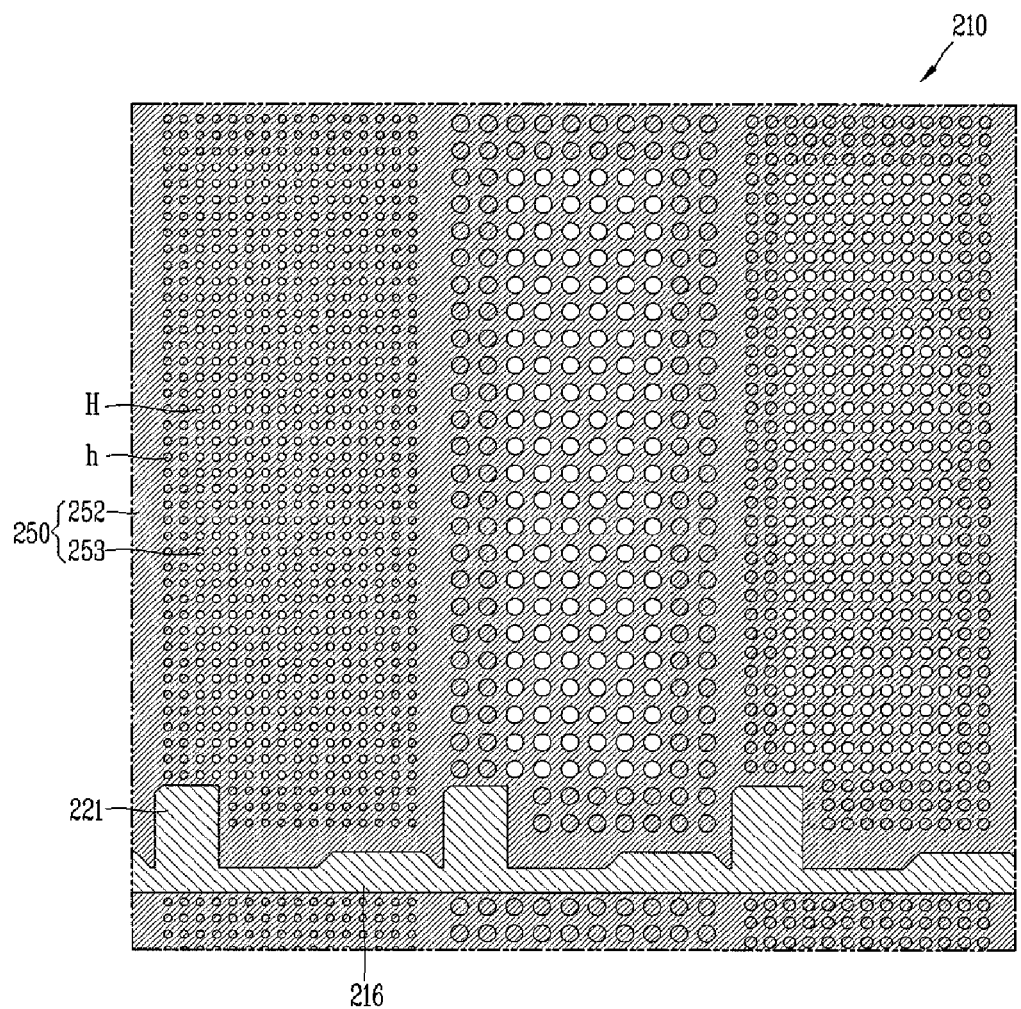

As shown in FIGS. 12B and 13B, a gate electrode 221 and a gate line 216 are formed on the array substrate 210 having the insulating layer 206 formed thereon.

Here, the gate electrode 221 and the gate line 216 are formed by depositing a first conductive film on the entire surface of the array substrate 210, and then by selectively patterning the first conductive film by a photolithography process.

The first conductive film may be formed of an opaque conductive material having a low resistance, such as aluminum (Al), Al alloy, tungsten (W), copper (Cu), chromium (Cr), molybdenum (Mo), and Mo alloy. Alternatively, the first conductive film may be formed to have a multi-structure implemented as at least two of the above materials are laminated on each other.

Figure 13C:
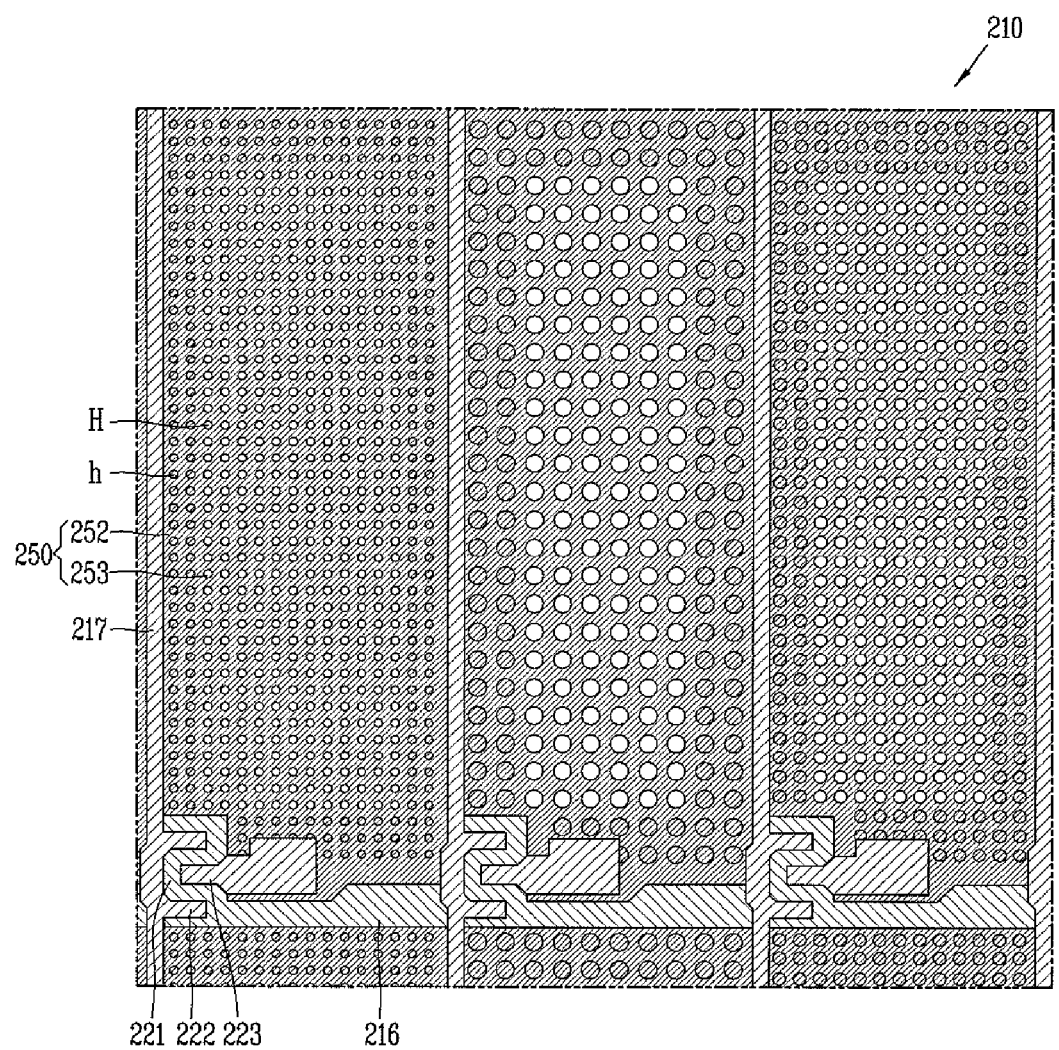

As shown in FIGS. 12C and 13C, on the entire surface of the array substrate 210 having the gate electrode 221 and the gate line 216 formed thereon, a first insulating layer 215a, an amorphous silicon thin film, an n+ amorphous silicon thin film, and a second conductive film are deposited, and then are selectively removed by a photolithography process. As a result, on the array substrate 210, formed are an active layer 224 formed of the amorphous silicon thin film, and source/drain electrodes 222 and 223 formed of the second conductive film and electrically connected to source/drain regions of the active layer 224.

A data line 217 formed of the second conductive film and crossing the gate line 216 to define a pixel region is formed by the photolithography process.

An ohmic contact layer 225n formed of the n+ amorphous silicon thin film and patterned in the same shape as the source/drain electrodes 222 and 223 is formed above the active layer 224.

An amorphous silicon thin film pattern (not shown) and an n+ amorphous silicon thin film pattern (not shown), each formed of the amorphous silicon thin film and the n+ amorphous silicon thin film, respectively, and each patterned in the same shape as the data line 217 are formed below the data line 217.

The active layer 224, the source/drain electrodes 222 and 223, and the data line 217 according to the second embodiment of the present invention may be simultaneously formed by a single mask process using a half-tone mask or a diffraction mask.

The second conductive film may be formed of an opaque conductive material having a low resistance, such as aluminum (Al), Al alloy, tungsten (W), copper (Cu), chromium (Cr), molybdenum (Mo), and Mo alloy, so as to constitute the source/drain electrodes 222 and 223 and the data line 217. Alternatively, the second conductive film may be formed to have a multi-structure implemented as at least two of the above materials are laminated on each other.

Figure 13D:
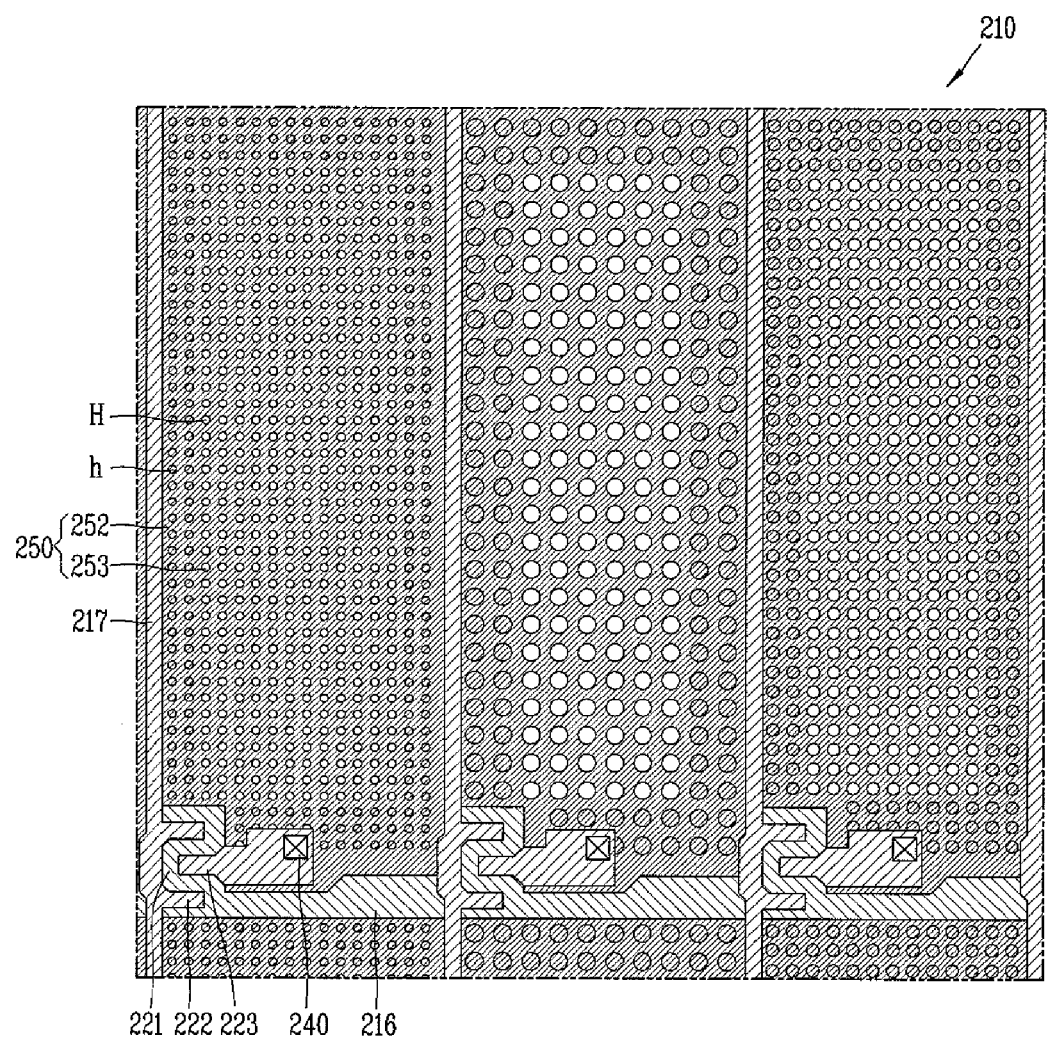

As shown in FIGS. 12D and 13D, a second insulating layer 215b is formed on the entire surface of the array substrate 210 having the active layer 224, the source/drain electrodes 222 and 223, and the data line 217 formed thereon. Then, the second insulating layer 215b is selectively removed by a photolithography process, thereby forming, on the array substrate 210, a contact hole 240 exposing a part of the drain electrode 223.

The second insulating layer 215b may be formed of an inorganic insulating layer such as silicon nitride or silicon oxide, or may be formed of an organic insulating layer such as photoacryl or benzocyclobutene (BCB).

Figure 12E:
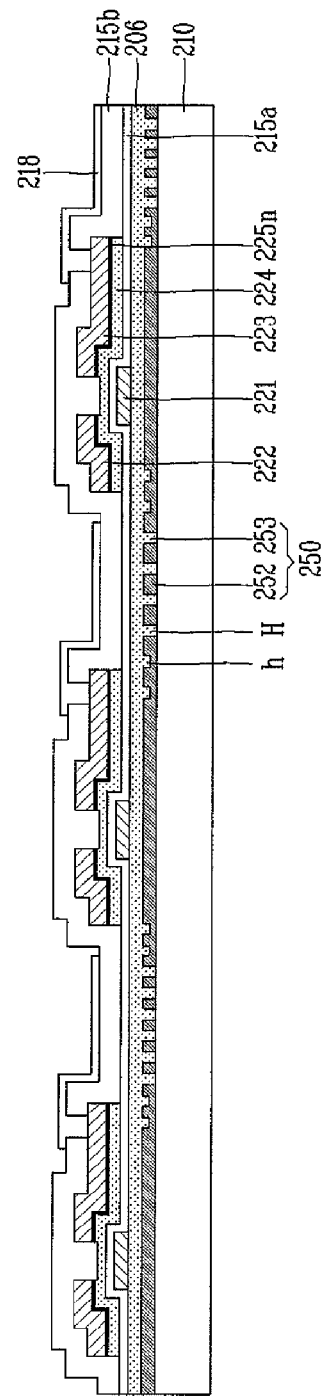
Figure 13E:
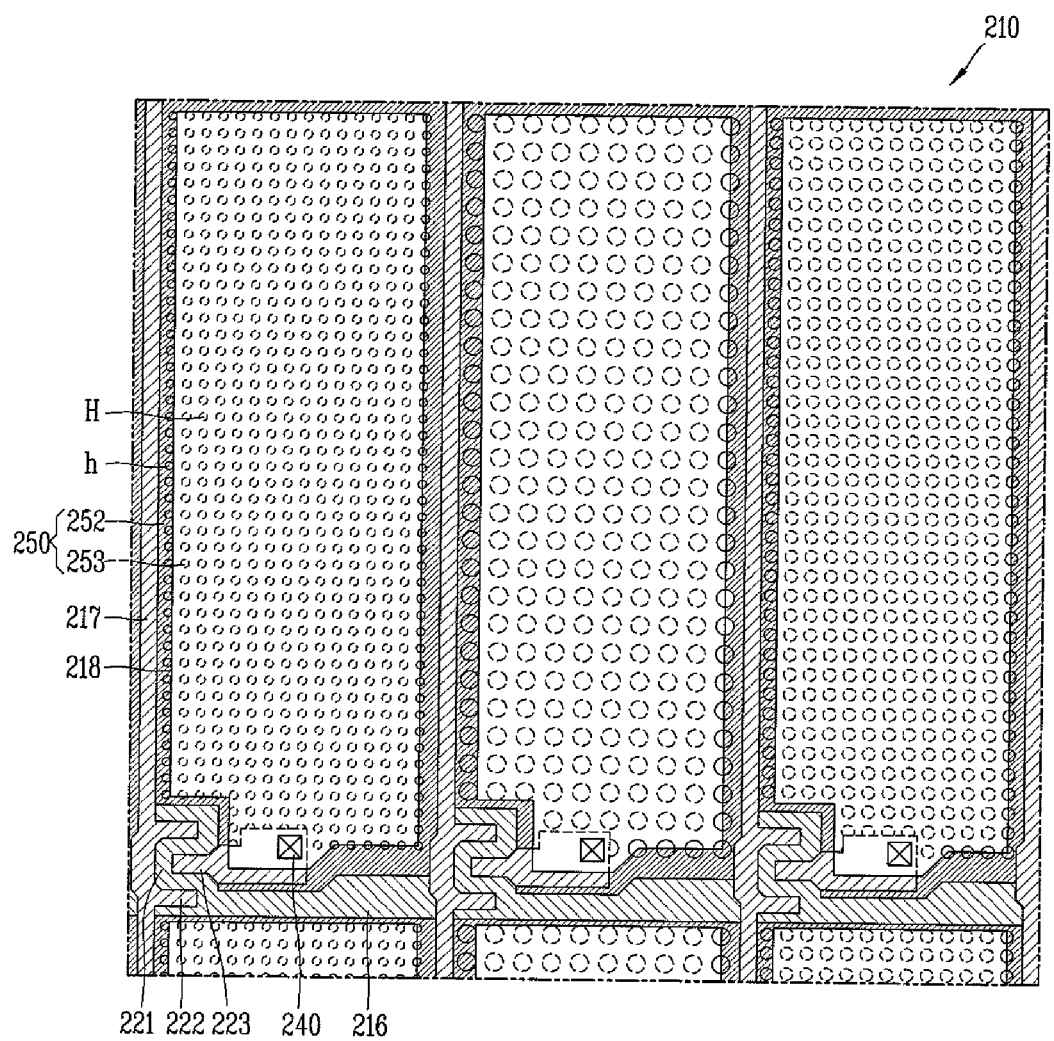

As shown in FIGS. 12E and 13E, a third conductive film is formed on the entire surface of the array substrate 210 having the second insulating layer 215b formed thereon, and then is selectively removed by a photolithography process. As a result, formed is a pixel electrode 218 electrically connected to the drain electrode 223 through the contact hole 240.

Here, the third conductive film includes a transparent conductive material having a high transmittance ratio, such as Indium Tin Oxide (ITO) or Indium Zinc Oxide (IZO) so as to constitute the pixel electrode.

As shown in FIG. 12F, the array substrate 210 according to the second embodiment of the present invention is bonded to the color filter substrate 205 with facing each other, by a sealant (not shown) formed on an outer periphery of an image display region, in a state that a constant cell gap is maintained therebetween by a column spacer 260.

A common electrode 208 rather than a color filter and a black matrix may be formed on the color filter substrate 205.

In the first and second embodiments, it was explained that the present invention was applied to an amorphous silicon thin film transistor using an amorphous silicon thin film as an active pattern. However, the present invention is not limited to this. That is, the present invention may be also applied to a polycrystalline silicon thin film transistor using a polycrystalline silicon thin film as an active pattern, and an oxide thin film transistor using an oxide semiconductor device as an active layer.

The present invention may be applied not only to an LCD device, but also to other display devices fabricated by using thin film transistors, e.g., an OLED display device in which Organic Light Emitting Diodes (OLED) are connected to driving transistors.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   a first substrate;
   a color filter formed on the first substrate, for implementing desired colors by forming, in metal layers, a plurality of sub-wavelength holes each having a different period;
   a plurality of non-penetrating grooves formed at a region encompassing the plurality of hole;
   an insulating layer formed on the metal layers including an inside of the plurality of holes and grooves, and formed of a same dielectric material as that of the first substrate;
   a thin film transistor (TFT) formed on the insulating layer, and formed at an intersection between a gate line and a data line arranged in horizontal and vertical directions to define a pixel region; and
   a second substrate bonded to the first substrate with facing the first substrate,
   wherein the second substrate includes no color filter and no black matrix.

2. The LCD device of claim 1, wherein each thickness of the metal layer corresponding to each color is differently controlled.

3. A liquid crystal display (LCD) device, comprising:
   a first substrate;
   a color filter formed on an outer surface of the first substrate, for implementing desired colors by forming, in metal layers, a plurality of sub-wavelength holes each having a different period;
   a plurality of non-penetrating grooves formed at a region encompassing the plurality of holes;
   an insulating layer formed on the metal layers including an inside of the plurality of holes and grooves, and formed of a same dielectric material as that of the first substrate;
   a thin film transistor (TFT) formed on an inner surface of the first substrate, and formed at an intersection between a gate line and a data line arranged in horizontal and vertical directions to define a pixel region; and
   a second substrate bonded to the first substrate with facing the first substrate,
   wherein the second substrate includes no color filter and no black matrix.

4. The LCD device of claim 3, wherein each thickness of the metal layer corresponding to each color is differently controlled.

5. The LCD device of claim 1, wherein the plurality of holes are formed in the pixel region except for a region where the gate line, the data line and the thin film transistor are formed.

6. The LCD device of claim 3, wherein the plurality of holes are formed in the pixel region except for a region where the gate line, the data line and the thin film transistor are formed.

7. A liquid crystal display (LCD) device, comprising:
   a thin film transistor (TFT) formed on a first substrate, and formed at an intersection between a gate line and a data line arranged in horizontal and vertical directions to define a pixel region;
   a second substrate;
   a color filter formed on the second substrate, for implementing desired colors by forming, in metal layers, a plurality of sub-wavelength holes each having a different period;
   a plurality of non-penetrating grooves formed at a region encompassing the plurality of holes; and
   an insulating layer formed on the metal layers including an inside of the plurality of holes and grooves, and formed of a same dielectric material as that of the second substrate,
   wherein the first substrate is bonded to the second substrate with facing the second substrate, and the color filter replaces a common electrode or a back electrode.

8. The LCD device of claim 7, further comprising a plurality of non-penetrating grooves having a period and formed near the plurality of holes having a period.

9. The LCD device of claim 7, wherein a horizontal sectional surface of the hole has one of a circular shape, a quadrangular shape, a triangular shape, an oval shape, and a slit shape having an aspect ratio more than one.

10. The LCD device of claim 7, wherein a horizontal sectional surface of the groove has one of a circular shape, a quadrangular shape, a triangular shape, an oval shape, and a slit shape having an aspect ratio more than one.

11. The LCD device of claim 7, wherein the metal layer is formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

12. The LCD device of claim 7, wherein each thickness of the metal layer corresponding to each color is differently controlled.

13. The LCD device of claim 7, wherein the plurality of holes are formed in the pixel region except for a region where the gate line, the data line and the thin film transistor are formed.

14. A method for fabricating a liquid crystal display (LCD) device, the method comprising:
providing first and second substrates;
forming, on the first substrate, a color filter for implementing desired colors by forming, in metal layers, a plurality of sub-wavelength holes each having a period;
forming a plurality of non-penetrating grooves formed at a region encompassing the plurality of holes;
forming an insulating layer on the metal layers including an inside of the plurality of holes and grooves, and formed of a same dielectric material as that of the first substrate;
forming a thin film transistor (TFT) on the insulating layer, and formed at an intersection between a gate line and a data line arranged in horizontal and vertical directions to define a pixel region; and
bonding the first substrate and the second substrate to each other, wherein the second substrate includes no color filter and no black matrix.

15. The method of claim 14, wherein each thickness of the metal layer corresponding to each color is differently controlled.

16. The method of claim 14, wherein the plurality of holes are formed in the pixel region except for a region where the gate line, the data line and the thin film transistor are formed.

17. A method for fabricating a liquid crystal display (LCD) device, the method comprising:
providing first and second substrates;
forming, on an outer surface of the first substrate, a color filter for implementing desired colors by forming, in metal layers, a plurality of sub-wavelength holes each having a period;
forming a plurality of non-penetrating grooves formed at a region encompassing the plurality of holes;
forming an insulating layer on the metal layers including an inside of the plurality of holes and grooves, and formed of a same dielectric material as that of the first substrate;
forming a thin film transistor (TFT) on an inner surface of the first substrate, and formed at an intersection between a gate line and a data line arranged in horizontal and vertical directions to define a pixel region; and
bonding the first substrate and the second substrate to each other, wherein the second substrate includes no color filter and no black matrix.

18. The method of claim 17, wherein each thickness of the metal layer corresponding to each color is differently controlled.

19. The method of claim 17, wherein the plurality of holes are formed in the pixel region except for a region where the gate line, the data line and the thin film transistor are formed.

20. A method for fabricating a liquid crystal display (LCD) device, the method comprising:
providing first and second substrates;
forming a thin film transistor on the first substrate, and formed at an intersection between a gate line and a data line arranged in horizontal and vertical directions to define a pixel region;
forming, on the second substrate, a color filter for implementing desired colors by forming, in metal layers, a plurality of sub-wavelength holes each having a period;
forming a plurality of non-penetrating grooves formed at a region encompassing the plurality of holes;
forming an insulating layer on the metal layers including an inside of the plurality of holes and grooves, and formed of a same dielectric material as that of the second substrate; and
bonding the first substrate and the second substrate to each other, wherein the color filter replaces a common electrode or a back electrode.

21. The method of claim 20, further comprising forming a plurality of non-penetrating grooves near the plurality of holes having a period.

22. The method of claim 20, wherein a horizontal sectional surface of the hole has one of a circular shape, a quadrangular shape, a triangular shape, an oval shape, and a slit shape having an aspect ratio more than one.

23. The method of claim 20, wherein a horizontal sectional surface of the groove has one of a circular shape, a quadrangular shape, a triangular shape, an oval shape, and a slit shape having an aspect ratio more than one.

24. The method of claim 20, wherein the metal layer is formed of a conductive material including at least one selected from a group consisting of aluminum (Al), gold (Au), silver (Ag), platinum (Pt), copper (Cu), nickel (Ni), palladium (Pd), zinc (Zn), iron (Fe), chrome (Cr), molybdenum (Mo), a doped semiconductor device, carbon nanotube, fullerene, conductive plastic, and electrical conductive composite material, or a mixture thereof.

25. The method of claim 20, wherein each thickness of the metal layer corresponding to each color is differently controlled.

26. The method of claim 20, wherein the plurality of holes are formed in the pixel region except for a region where the gate line, the data line and the thin film transistor are formed.

27. The method of claim 20, wherein the metal layers are formed by using one of a gas phase method, a liquid phase method, a solid phase method, and a nanosol coating method.

28. The method of claim 20, wherein the plurality of holes are formed by using one of an e-beam lithography, an ion beam milling, a nanosphere lithography, a nano imprinting, a photolithography, and a laser interference lithography.

29. The method of claim 20, wherein the plurality of grooves are formed by one of an etching process, a milling process, and a metal deposition process.

* * * * *